United States Patent
Lloyd (10) Patent No.: US 8,311,875 B1
(45) Date of Patent: Nov. 13, 2012

(54) CONTENT ITEM LOCATION ARRANGEMENT

(75) Inventor: Matthew I. Lloyd, Santa Monica, CA (US)

(73) Assignee: Google Inc., Mountain View, CA (US)

(*) Notice: Subject to any disclaimer, the term of this patent is extended or adjusted under 35 U.S.C. 154(b) by 1048 days.

(21) Appl. No.: 11/928,840

(22) Filed: Oct. 30, 2007

(51) Int. Cl.
*G06Q 10/00* (2012.01)

(52) U.S. Cl. .................................. 705/7.29

(58) Field of Classification Search .......... 705/7.29
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,948,061 A | 9/1999 | Merriman | |
| 6,026,368 A | 2/2000 | Brown et al. | |
| 6,044,376 A | 3/2000 | Kurtzman, II | |
| 6,078,914 A | 6/2000 | Redfern | |
| 6,144,944 A | 11/2000 | Kurtzman, II et al. | |
| 6,167,382 A | 12/2000 | Sparks et al. | |
| 6,269,361 B1 | 7/2001 | Davis et al. | |
| 6,401,075 B1 | 6/2002 | Mason et al. | |
| 6,985,882 B1 | 1/2006 | Del Sesto | |
| 7,039,599 B2 | 5/2006 | Merriman | |
| 7,136,875 B2 | 11/2006 | Anderson et al. | |
| 7,548,915 B2 * | 6/2009 | Ramer et al. | 705/14.54 |
| 2007/0061331 A1 * | 3/2007 | Ramer et al. | 707/10 |
| 2007/0094042 A1 * | 4/2007 | Ramer et al. | 705/1 |
| 2007/0128899 A1 * | 6/2007 | Mayer | 439/152 |

FOREIGN PATENT DOCUMENTS
WO WO 97/21183 6/1997

OTHER PUBLICATIONS

U.S. Appl. No. 95/001,073, filed Sep. 30, 2004, Stone et al.
U.S. Appl. No. 95/001,061, filed Sep. 3, 2002, Stone et al.
U.S. Appl. No. 95/001,069, filed Jul. 11, 2002, Dean et al.
U.S. Appl. No. 95/001,068, filed Dec. 7, 2002, Stone et al.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www.Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.

(Continued)

*Primary Examiner* — Johnna Loftis
(74) *Attorney, Agent, or Firm* — Fish & Richardson P.C.

(57) ABSTRACT

One or more content items associated with a content property are identified, each of the one or more content items associated with one or more performance measures. A rank score is determined for each of the one or more content items. One or more locations are identified for display proximate to the one or more content items based on the rank score for each of the one or more content items, and one or more other content items are provided for display in each of the one or more content item locations.

21 Claims, 6 Drawing Sheets

OTHER PUBLICATIONS

Information Access Technologies, Inc., Aaddzz brochure, "The Best Way to Buy and Sell Web Advertising Space," © 1997.

Information Access Technologies, Inc., Aaddzz.com website archive from www.Archive.org, archived on Jan. 30, 1998.

Zeff, R. et al., Advertising on the Internet, 2nd Ed., John Wiley & Sons, 1999.

Dedrick, R., Interactive Electronic Advertising, IEEE, 1994.

Dedrick, R., A Consumption Model for Targeted Electronic Advertising, Intel Architecture Labs, IEEE, 1995.

Request for Reexamination of U.S. Patent No. 7,240,025 B2, Control No. 95/001,073.

Request for Reexamination of U.S. Patent No. 6,446,045 B1, Control No. 95/001,061.

Request for Reexamination of U.S. Patent No. 7,249,059 B2, Control No. 95/001,069.

Request for Reexamination of U.S. Patent No. 6,829,587 B2, Control No. 95/001,068.

* cited by examiner

CONTENT ITEM LOCATION ARRANGEMENT

BACKGROUND

This disclosure relates to content identification and distribution.

Content items, such as advertisements, can be distributed to users. The distribution can be based on a keyword search query, or it can be based on the content of a publisher's website. The relevant content items can be displayed to the user, and the user can interact with (e.g., click on) particular content items.

Based on the locations of the content items, it can be determined that some users are more likely to interact with these content items. Furthermore, the users may be more likely to interact with the content items if they are in a particular location on a content property.

SUMMARY

Disclosed herein are systems and methods for positioning content items on a content property. In one implementation, one or more content items associated with a content property are identified, each of the one or more content items associated with one or more performance measures. A rank score is determined for each of the one or more content items. One or more locations are identified for display proximate to the one or more content items based on the rank score for each of the one or more content items, and one or more other content items are provided for display in each of the one or more locations.

In another implementation, one or more content item locations are identified on a content property. A rank score associated with each of the one or more content item locations is determined. One or more locations are identified for display proximate to the one or more locations, and one or more content items are provided for display in each of the one or more locations.

In another implementation, a system includes a content item engine that is operable to identify one or more content items associated with a content property, each of the one or more content items associated with one or more performance measures, determine a rank score for each of the one or more content items, identify one or more locations for display proximate to the one or more content items based on the rank score for each of the one or more content items, and provide one or more other content items for display in each of the one or more locations. The details of one or more embodiments of the invention are set forth in the accompanying drawings and the description below. Other features, objects, and advantages of the invention will be apparent from the description and drawings, and from the claims.

DETAILED DESCRIPTION

Figure 1:
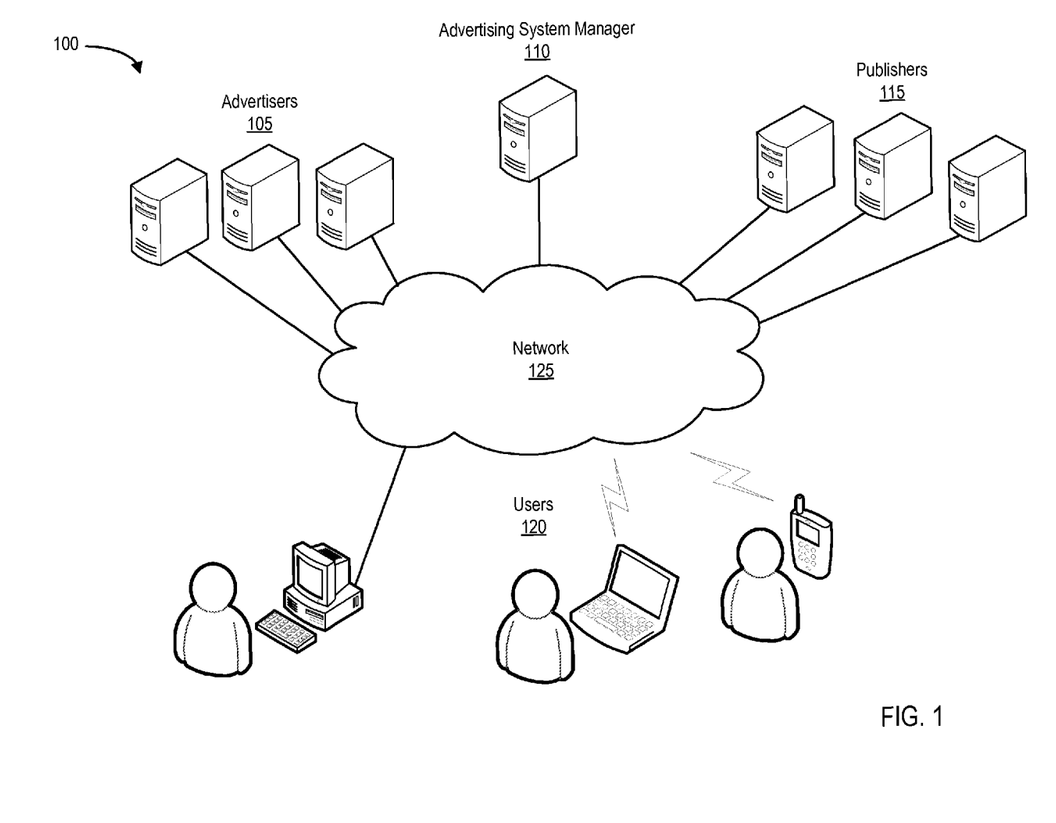
FIG. 1 is a block diagram of an example online advertising system.

FIG. 1 is a block diagram of an example online advertising system 100. In some implementations, one or more advertisers 105 can directly, or indirectly, enter, maintain, and track advertisement information in an advertising management system 110. The advertisements can be in the form of graphical advertisements, such as banner advertisements, text only advertisements, image advertisements, audio advertisements, video advertisements, advertisements combining one of more of any of such components, etc. The advertisements can also include embedded information, such as links, meta-information, and/or machine executable instructions. One or more publishers 115 can submit requests for advertisements to the system 110. The system 110 responds by sending advertisements to the requesting publisher 115 for placement on one or more of the publisher's web properties (e.g., websites and other network-distributed content). Though reference is made to advertisements, other forms of content can be served by the system 110.

Other entities, such as users 120 and the advertisers 105, can provide usage or interaction information to the system 110, such as, for example, whether or not a conversion or click-through related to an advertisement has occurred. This usage information can include measured or observed user behavior related to advertisements that have been served. The usage information can also include information that relates to the location data, such as the number of clicks at particular locations historically on a content property. The system 110 performs financial transactions, such as crediting the publishers 115 and charging the advertisers 105 based on the usage information.

A computer network 125, such as a local area network (LAN), wide area network (WAN), the Internet, or a combination thereof, connects the advertisers 105, the system 110, the publishers 115, and the users 120.

One example of a publisher 115 is a general content server that receives requests for content (e.g., articles, discussion threads, music, video, graphics, search results, web page listings, information feeds, etc.), and retrieves the requested content in response to the request. The content server can submit a request for advertisements to an advertisement server in the system 110. The advertisement request can include a number of advertisements desired. The advertisement request can also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server can combine the requested content with one or more of the advertisements provided by the system 110. This combined content and advertisements can be sent to the user that requested the content for presentation in a viewer (e.g., a browser or other content display system). The content server can transmit information about the advertisements back to the advertisement server, including information describing how, when, and/or where the advertisements are to be rendered (e.g., in HTML or JavaScript™).

Another example publisher 115 is a search service. A search service can receive queries for search results. In response, the search service can retrieve relevant search results from an index of documents (e.g., from an index of web pages). An exemplary search service is described in the article S. Brin and L. Page, "The Anatomy of a Large-Scale Hypertextual Search Engine," Seventh International World Wide Web Conference, Brisbane, Australia and in U.S. Pat. No. 6,285,999. Search results can include, for example, lists of web page titles, snippets of text extracted from those web pages, and hypertext links to those web pages, and can be grouped into a predetermined number of (e.g., ten) search results.

The search service can submit a request for advertisements to the system 110. The request can include a number of advertisements desired. This number can depend on the search results, the amount of screen or page space occupied by the search results, the size and shape of the advertisements, etc. In some implementations, the number of desired advertisements will be from one to ten, or from three to five. The request for advertisements can also include the query (as entered or parsed), information based on the query (such as geo-location information, whether the query came from an affiliate and an identifier of such an affiliate), and/or information associated with, or based on, the search results. Such information can include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search service can combine the search results with one or more of the advertisements provided by the system 110. This combined information can then be forwarded to the user that requested the content. The search results can be maintained as distinct from the advertisements, so as not to confuse the user between paid advertisements and presumably neutral search results.

Finally, the search service can transmit information about the advertisement and when, where, and/or how the advertisement is to be rendered back to the system 110.

As can be appreciated from the foregoing, the advertising management system 110 can serve publishers 115, such as content servers and search services. The advertising management system 110 permits serving of advertisements targeted to documents served by content servers. For example, a network or inter-network can include an advertisement server serving targeted advertisements in response to requests from a search service with advertisement spots for sale. Suppose that the inter-network is the World Wide Web. The search service can crawl much or all of the content. Some of this content will include advertisement spots (also referred to as "inventory") available. More specifically, one or more content servers can include one or more documents. Documents can include web pages, email, content, embedded information (e.g., embedded media), meta-information and machine executable instructions, and advertisement spots available. The advertisements inserted into advertisement spots in a document can vary each time the document is served or, alternatively, can have a static association with a given document.

In one implementation, the advertising management system 110 can render one or more advertisements on a content property, or content page. The advertisement can, for example, be rendered in one or more locations on the content property. The advertisements can be rendered according to one or more performance metrics associated with the advertisements as well as interaction rates associated with the location and location slots.

Figure 2:
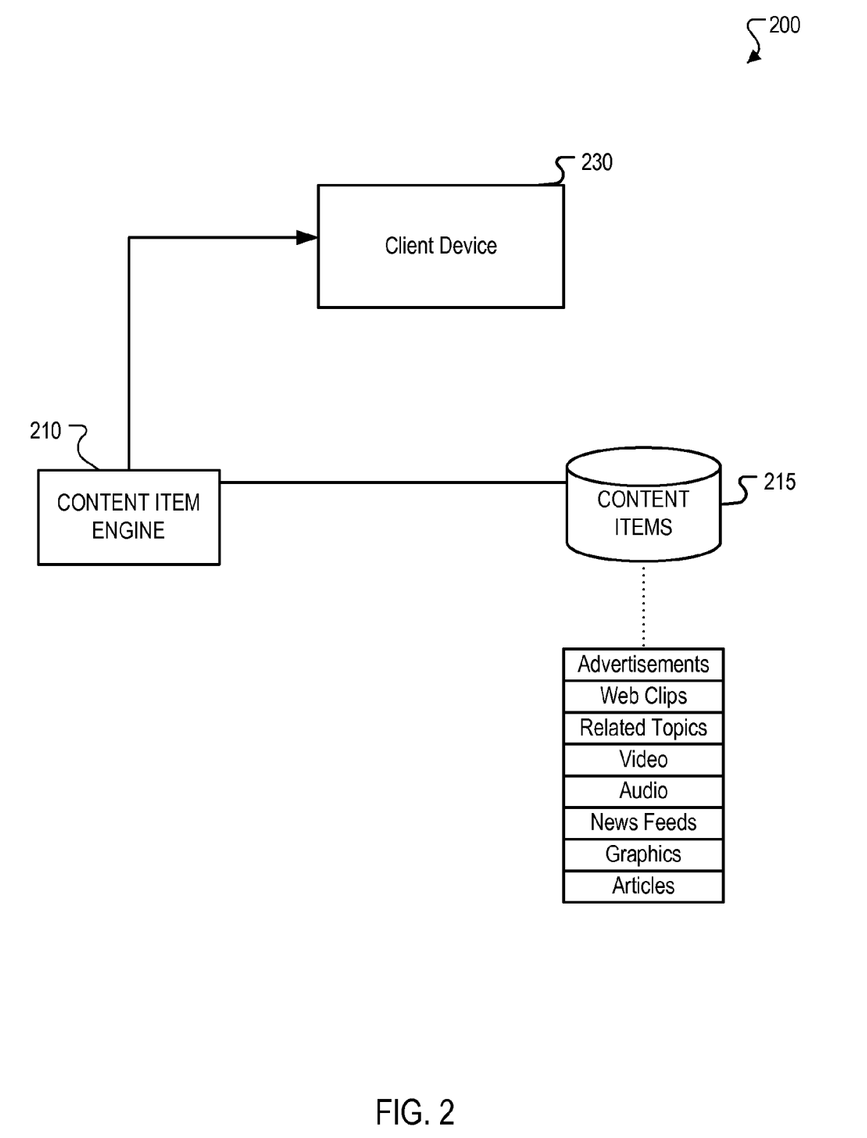
FIG. 2 is a block diagram of an example content item placement system.

FIG. 2 is a block diagram of an example content item placement system 200. The content item placement system 200 can, for example, be implemented in a computer device or one or more computer devices connected through a network, e.g., a LAN or a WAN, such as the Internet. The content item placement system 200 can, for example be implemented in the advertising system manager 110, which can be implemented in a computing system. The one or more computing devices can, for example, include memory devices storing processing instructions and processing devices for executing the processing instructions. An example computing system is shown and described with reference to FIG. 8. Other implementations, however, can also be used.

The content item placement system 200 can include a content item engine 210. The content item engine 210 can, for example, be distributed among a plurality of computer devices, e.g. server computers communicating over a network, or can be implemented on a single computer, e.g., as multiple threads on a server computer. Other implementation architectures can also be used. The content item engine 210 can, for example, be implemented in software, such as executable object code, interpreted script instructions, or in combinations of executable and interpreted instructions. Other software and/or hardware implementations can also be used.

In one implementation, an example publisher 115 in an example implementation of an online advertising system 100 is a search service. A search service can receive a search query from a user for search results. The search service can submit the search query to the advertising management system 110 that can be used to identify potentially relevant content items, e.g., advertisements, from a content items database 215. For example, a relevant content item from the content items database 215 can be one of a variety of different content item types, e.g., advertisements, video, audio, text, news feeds, digital print, images, etc., that is determined to be relevant to one or more keywords in a search query.

In another implementation, an example publisher 115 in an example implementation of an online advertising system 100 is a general content server. A general content server can receive a request for content items, e.g., advertisements, articles, discussion threads, music, video, graphics, search results, web page listings, information feeds, related topics, etc., from the content items database 215 and retrieve the requested content in response to the request.

Figure 3:
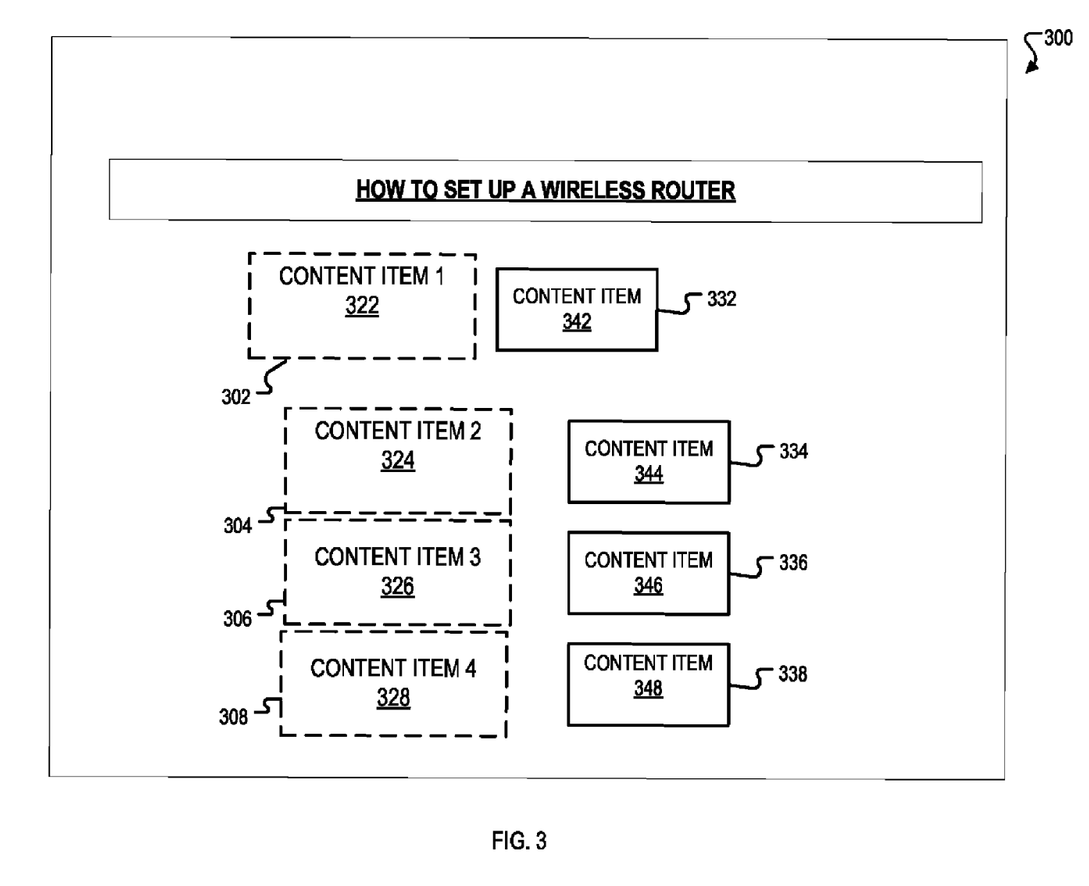
FIG. 3 is an example user interface for a content property.

FIG. 3 is an example user interface for a content property 300 that can display the relevant content items from the content items database 215 to a user. In one implementation, the content item engine 210 can identify one or more content items 322, 324, 326, 328 on the content property 300. The content items 322, 324, 326, 328 can include one or more identified content item types, such as advertisements, articles, discussion threads, music clips, video clips, graphics, search results, web clips, web page listings, information feeds, related topics, etc. For example, the web clips can be taken from one or more "Really Simple Syndication" (RSS) feeds.

Each of the content items 322, 324, 326, 328 can be associated with content item locations 302, 304, 306, 308, where the one or more content items 322, 324, 326, 328 are displayed. Each of the content items 322, 324, 326, 328 can be associated with one or more performance measures, such as a click-through rate (CTR). A click-through rate can be a rate that represents the number of times a user has clicked on a content item divided by the number of impressions, e.g., the number of times a content item has been displayed to a user. The content items 322, 324, 326, 328 can be located anywhere on the content property 300 and do not necessarily have to be located near other content items on the content property 300.

In one implementation, the one or more content items 322, 324, 326, 328 can be associated with one or more interaction rates. For example, the interaction rates can include the number of times an item advertised in a content item, or a content item type, is purchased by the user. In another implementation, the interaction rates can include the length of time a user views a content item, or hovers the user's mouse cursor proximate to the content item, etc.

In one implementation, the content item engine 210 can determine a rank score for each of the one or more content items 322, 324, 326, 328. The rank score can be used to determine placement of locations near the content items. The rank score can, for example be based on one or more performance measures associated with each of the content items 322, 324, 326, 328.

In one implementation, the content items 322, 324, 326, 328 can be associated with one or more keywords. The content engine 210 can determine whether any of the content items are associated with any "hot" or popular keywords. The specific keywords, can, for example, include keywords that are relevant at a particular time or keywords that are of particular interest. For example, the content engine 210 can determine that the keyword "costume" is a popular keyword around the month of October. In another example, the content engine 210 can determine that keywords related to "snow" are popular in the months of January and February. The content engine 210 can determine rank scores for the content items 322, 324, 326, 328 depending on the number of popular keywords that are associated with each content item 322, 324, 326, 328.

In one implementation, a machine learning system can be used to identify various concepts present in the content items 322, 324, 326, 328. The content engine 210 can then rate the concepts for user relevancy and interest. The machine learning system can, for example, recognize that a particular piece of the text in the content items 322, 324, 326, 328 is about the "car" concept because it contains the words "SUV" or "convertible." These associations between words and concepts can be derived from some machine learning algorithm, e.g. a Bayesian network. The system might also then know that the car concept is highly interesting and relevant to readers based on historical CTRs, or hot keywords and concepts listed by a human.

In one implementation, the content item engine 210 can determine rank scores by how recently the content items 322, 324, 326, 328 were placed on the content property 300. The content item engine 210 can, for example, identify a time stamp associated with each of the content items 322, 324, 326, 328. The time stamp can indicate when the content item was placed on the content property. Based on the time stamp, the content item engine 210 can determine which of the content items 322, 324, 326, 328 are the most recent, and have been displayed on the content property 300 the shortest amount of time. For example, the content property 300 can be updated continuously with new content items placed on the content property 300 and older content items can be removed. The content item engine 210 can determine the rank score for the content items 322, 324, 326, 328 based on how long the content items have been displayed on the content property 300. For example, the content item that has been displayed on the content property 300 the shortest amount of time can be given the highest rank score.

In one implementation, the content items 322, 324, 326, 328 can include messages, or text appearing in messages in a message board. The message board can include one or more messages. Each message can, for example, be associated with a "read" or "unread" flag. In one implementation, the content item engine 210 can determine whether any of the messages or text in the message board have not been read by a user associated with the content property 300. For example, the content property 300 may require a user to sign in before reading the messages in the message board. If a message has been read, the message can be marked with a "read" flag. The content item engine 210 can determine the rank score for each of the messages, or text, in the message board based on whether the text or message has or has not been read. For example, a message that has not been read can be associated with a higher rank score than a message that has already been read. The rank score can be higher because a user would most likely be drawn more to the message that has not been read, rather than a message that has already been read.

For example, a web server that serves the page content itself may have advance knowledge about the content of greatest interest to the reader, through a variety of means. In the case of a content property 300 consisting of a sequence of messages, the web server already knows which messages are the most recent or have not yet been read by the user, and the areas or locations on the content property 300 around these most recent messages are likely to be of greatest interest to a user.

In one implementation, the content item engine 210 can determine a rank score for the one or more content items 322, 324, 326, 328 according to the performance measures associated with each content item. The content item engine 210 can, for example, identify the click-through rates associated with each of the one or more content items and determine the rank score based on the click-through rate. For example, the content items 322, 324, 326, 328 can be associated with a rank score equaling the click-through rate. For example, if the content items 322, 324, 326, 328 are associated with click-through rates of 8%, 7%, 4%, and 2% respectively, the rank score can equal the same percentages. Therefore the rank score for the content items 322, 324, 326, 328 would be 0.08, 0.07, 0.04, and 0.02, respectively.

In one implementation, the content item locations 302, 304, 306, 308 on the content property 300 can be associated with predetermined rank scores. For example, if the content on the content property 300 has been arranged by a separate system or user, he or she may be able to 'tag' in advance the most interesting parts of the content property 300. For example, the system can tag the top portions of the content property 300 as areas of interest.

The content item engine 210 can determine rank scores for the content items 322, 324, 326, 328 as well as the content item locations 302, 304, 306, 308. The content item engine 210 can, for example, determine to place other content items 322, 324, 326, 328 proximate to the content items or content item locations 302, 304, 306, 308 based on the rank scores associated with each content item or location.

In one implementation, the content item engine 210 can determine a rank score for the one or more content item locations 302, 304, 306, 308. In one implementation, the client device 230 can determine the rank score for the content item locations 302, 304, 306, 308 by identifying how long users spend on various parts of the content property 300. The client device 230 can, for example, identify how long a user spends on various parts of the content property 300 by recording the amount of time the user's mouse cursor hovers in a particular location. If the mouse cursor hovers in a location for a longer period of time than other locations, the location is associated with a higher rank score than the other locations on the content property 300.

In one implementation, the client device 230 can determine the rank score by identifying locations on the content property 300 with the most up to date information. For example, the client device 230 can determine when each content item 322, 324, 326, 328 was placed on the content property 300. Depending on a time stamp associated with the content item 322, 324, 326, 328, the client device 230 can determine the most up to date content items on the content property 300. The client device 230 can, for example, associate a higher rank score with the content items 322, 324, 326, 328 that are the most recent on the content property 300. If the content items on the content property 300 changes, or loads gradually or dynamically based on, for example user interaction, the client device 230, e.g., the browser, has the best and most up to date information about where the most salient content is located. For example, from JavaScript, it is easy to determine which message in a thread is the most recent.

In one implementation, the content item engine 210 determines locations on the content property 300 to place other content items, such as advertisements, based on the rank score for the one or more content items 322, 324, 326, 328. The content item engine 210 can, for example, provide one or more locations 332, 334, 336, 338 proximate to the one or more content items 332, 324, 326, 328. For example, the one or more locations 332, 334, 336, 338 can be located next to, either on the left or on the right of, the one or more content items 332, 324, 326, 328, or above or below the content items. The one or more locations 332, 334, 336, 338 can be of different sizes and shapes. The content item engine 210 can display the locations 332, 324, 326, 328 based on the rank score of the one or more content items. For example, the content items 322, 324, 326, 328 can be ranked in decreasing order of rank score and the locations 332, 334, 336, 338 can be associated with each content item 322, 324, 326, 328 in decreasing order.

In one implementation, the content item engine 210 can provide the one or more other content items 342, 344, 346, and 348 for display at each of the one or more locations 332, 334, 336, 338 based on the rank score of the one or more content items 322, 324, 326, 328. For example, each location 332, 334, 336, 338 can be used to display one other content item. The content item with the highest rank score can be associated with a location that will display the highest-ranking content item.

For example, suppose the content items were ranked by the highest click-through rate associated with each content item. Content item 322 had a click-through rate of 8%, content item 324 had a click-through rate of 7%, content item 326 had a click though rate of 4%, and content item 328 had a click-through rate of 2%. The locations 332, 334, 336, 338 can be positioned next to the content items 322, 324, 326, 328.

Other content items 342, 344, 346, 348 can be displayed in each location depending on a performance measure associated with the other content items. For example, the other content items 342, 344, 346, 348 can be ranked according to one or more performance measures, such as click-through rate. Therefore if the click-through rates of the other content items 342, 344, 346, 348 are 4%, 3%, 2%, and 1%, respectively, then the highest ranking content item, content item 342 with a click-through rate of 4% can be associated with the highest ranking location, which is the location located next to the highest ranking content item. In this example, the highest ranking content item is content item 324, with a click-though rate of 8%. Therefore, the other content item 344 can be displayed in the location 344, located next to content item 324.

In one implementation, the content engine 210 can determine the context or topic associated with each content item 322, 324, 326, 328 as well as the other content items 342, 344, 346, 348. The content engine 210 can, for example, place the other content item 342, 344, 346, 348 proximate to the content items 322, 324, 326, 328 with the same or similar context or topic. Therefore, others content items such as an advertisement on a particular topic is close or proximate to content items, e.g., message boards, most closely related to that same topic. For example, if a message board consists of shopping and entertainment threads on the same content property or content page, the content engine 210 can position a shopping advertisement next to the shopping message threads and the entertainment advertisement next to the entertainment message threads.

In one implementation, the HTML or CSS served to a browser by a web server can be altered to move the locations on the content property 300. This can be accomplished by inserting the HTML for the ad location at a dynamically determined position within the HTML and hence on the page. In another implementation, the properties of the HTML div/tag, or the CSS styles can be altered so that the browser positions the ads appropriately. A server-side scripting language like Python or PHP, or a templating language might be used to do this, or the web server could directly generate the appropriately formatted HTML/CSS source code. Alternative implementations include dynamically rendering the ad location into an image that contains the page content.

In the client-side implementation, the location can be dynamically repositioned on the page using a web scripting language that runs in the browser, e.g. JavaScript. Alternative implementations of this include the use of any other scripting language or browser display technology, such as Flash, Adobe PDF, SVG, Java, or VRML. In whatever language, the code can reposition the ad location once at page load time, or dynamically reposition the location in response to real-time changes made to the page content by other code, e.g. the appearance of a new message in a forum thread. In the latter case, the ad location can be positioned proximate to the latest message as the thread grows in any specific direction.

In one implementation, a server, such as the content server, can render the identified other content items 342, 344, 346, 348 in a content property 300 by serving code, e.g., HTML, CSS, etc., to a browser. For example, to render the identified other content items 342, 344, 346, 348 based on the determined placement, the content server can alter the code to move a location, e.g. 332, 334, 336, 338, on a content property 300. The code for the location can, for example, be inserted at a dynamically determined position within the code to change its location on the content property.

In another implementation, the same dynamic methods could be used to place the content items within each slot, in addition to positioning the locations/slots on the page as described above.

In another implementation, the properties of the HTML "<div>" tag that is served to the content property can be altered so the browser displaying the content property will position the location in the determined placement. In another implementation, the properties of the CSS code that is served to the content property can be altered so the browser displaying the content property will position the location in the determined placement. In one implementation, the HTML and CSS code can be altered by using a server-side scripting language, e.g., Python or PHP, or a templating language. In another implementation, the content server can directly generate the appropriately formatted HTML and/or CSS code. In another implementation, the location can be dynamically rendered into an image that contains the content for the content property.

In another implementation, a client-side implementation can be used to render the identified content items in a content property based on the determined placement. In the client-side implementation, the location can be dynamically positioned/repositioned on the content property by utilizing a web scripting language that runs in the browser, e.g. JavaScript. In another implementation, the location can be dynamically repositioned on the content property by utilizing other scripting languages or browser display technology, such as Flash, Adobe PDF, SVG, Java, or VRML.

For example, regardless of the scripting language, in one implementation, the code can position/reposition the location once at the load time of the content property. In another implementation, the code can dynamically reposition the location in response to real-time changes made to the content of the content property by other code, e.g. a new email being received in a web-based email client.

Figure 4:
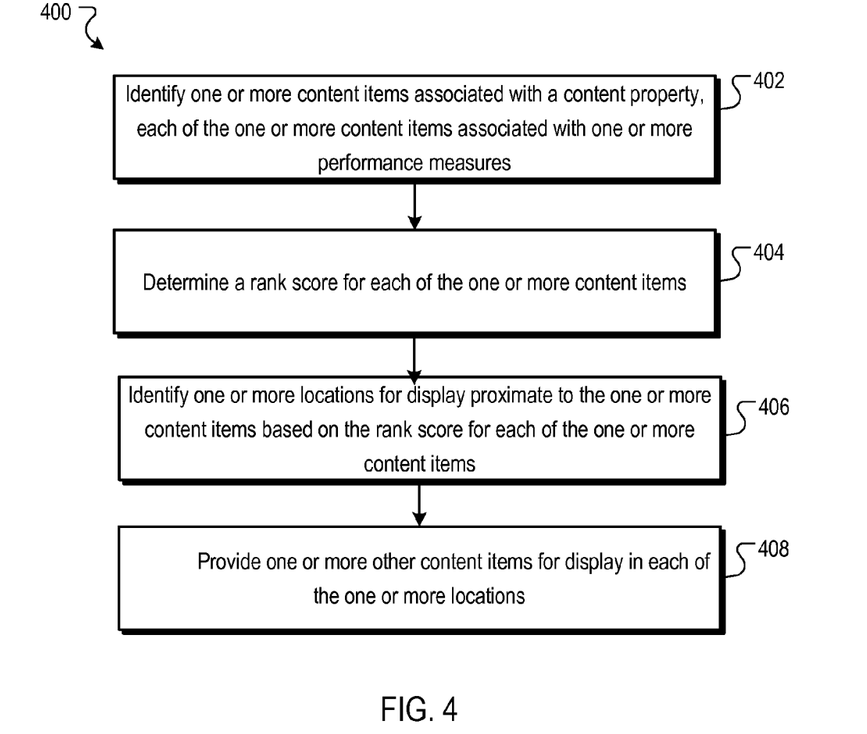
FIG. 4 is a flow diagram of an example process for placing a content item on a content property.

FIG. 4 is a flow diagram of an example process 400 for placing a content item. The process 400 can, for example, be implemented in the content item placement system 200.

Stage 402 identifies one or more content items associated with a content property, each of the one or more content items associated with one or more performance measures. For example, the content item engine 210 can identify one or more content items associated with a content property, each of the one or more content items associated with one or more performance measures. Stage 404 determines a rank score for each of the one or more content items. For example, the content item engine 210 can determine a rank score for each of the one or more content items. Stage 406 identifies one or more locations for display proximate to the one or more content items based on the rank score for each of the one or more content items. For example, the content item engine 210 can identify one or more locations for display proximate to the one or more content items based on the rank score for each of the one or more content items. Stage 408 provides one or more other content items for display in each of the one or more locations. For example, the content item engine 210 can provide one or more other content items for display in each of the one or more locations.

Figure 5:
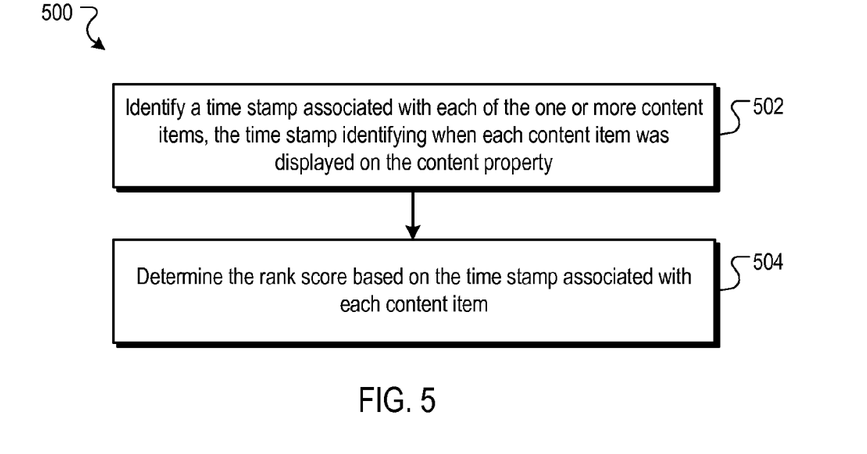
FIG. 5 is a flow diagram of an example process for determining a rank score for one or more content items.

FIG. 5 is a flow diagram of an example process 500 for determining a rank score for one or more content items. The process 500 can, for example, be implemented in the content item placement system 200. Stage 502 identifies a time stamp associated with each of the one or more content items, the time stamp identifying when each content item was displayed on the content property. For example, the content item engine 210 can identify a time stamp associated with each of the one or more content items, the time stamp identifying when each content item was displayed on the content property. Stage 504 determines the rank score based on the time stamp associated with each content item. For example, the content item engine 210 can determine the rank score based on the time stamp associated with each content item.

Figure 6:
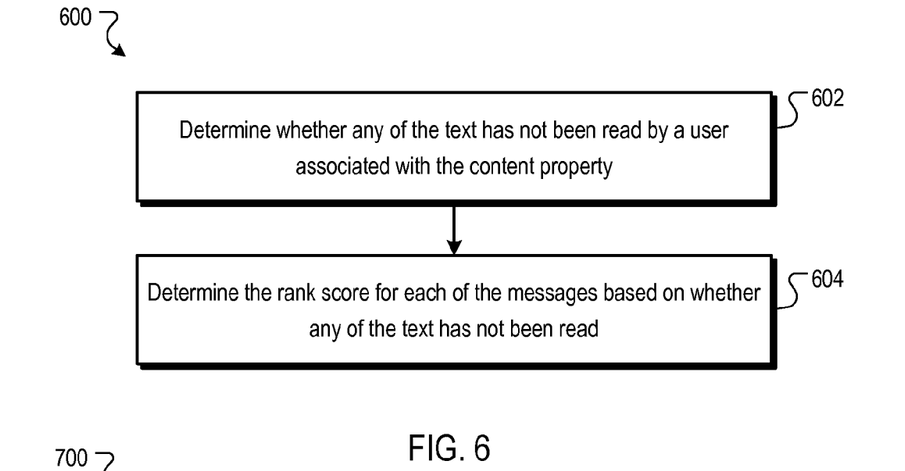
FIG. 6 is a flow diagram of another example process for determining a rank score for one or more content items.

FIG. 6 is a flow diagram of another example process 600 for determining a rank score for one or more content items. The process 600 can, for example, be implemented in the content item placement system 200. Stage 602 determines whether any of the text has not been read by a user associated with the content property. For example, the content item engine 210 can determine whether any of the text has not been read by a user associated with the content property. Stage 604 determines the rank score for each of the messages based on whether any of the text has not been read. For example, the content item engine 210 can determine the rank score for each of the messages based on whether any of the text has not been read.

Figure 7:
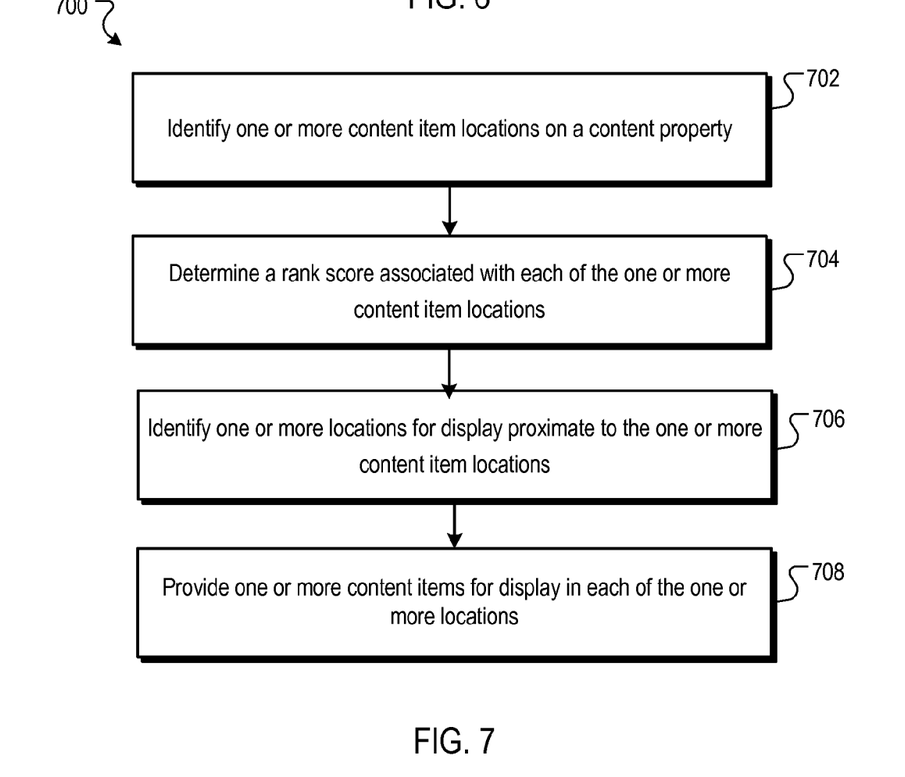
FIG. 7 is a flow diagram of an example process for placing a content item on a content property.

FIG. 7 is a flow diagram of an example process 700 for placing a content item. The process 700 can, for example, be implemented in the content item placement system 200. Stage 702 identifies one or more content item locations on a content property (e.g., a web page, a game scene, a printed publication, a radio stream). For example, the client device 230 can identify one or more content item locations on a content property. The client device 230 can identify active areas of a content property. The content property can be a web property or a web radio property, a game, a radio broadcast (e.g., the morning commute hours from 8-8:30 and 4-4:30), print ad space (back page or front page, etc.).

Stage 704 determines a rank score associated with each of the one or more content item locations. For example, the client device 230 can determine a rank score associated with each of the one or more content item locations. Stage 706 identifies or displays one or more locations relative to the one or more content item locations based on the rank score. For example, the client device 230 can identify or display one or more locations relative to the one or more content item locations based on the rank score. The client device 230 can identify locations in proximity to the active areas.

Stage 708 provides one or more content items for display in each of the one or more locations. For example, the client device 230 can provide one or more content items for display in the each of the one or more locations. The client device 230 can render the identified content items in a content property based on the determined placement. For example, HTML and/or CSS code can be served to a browser to render the identified content items on a content property to be displayed to a user.

Figure 8:
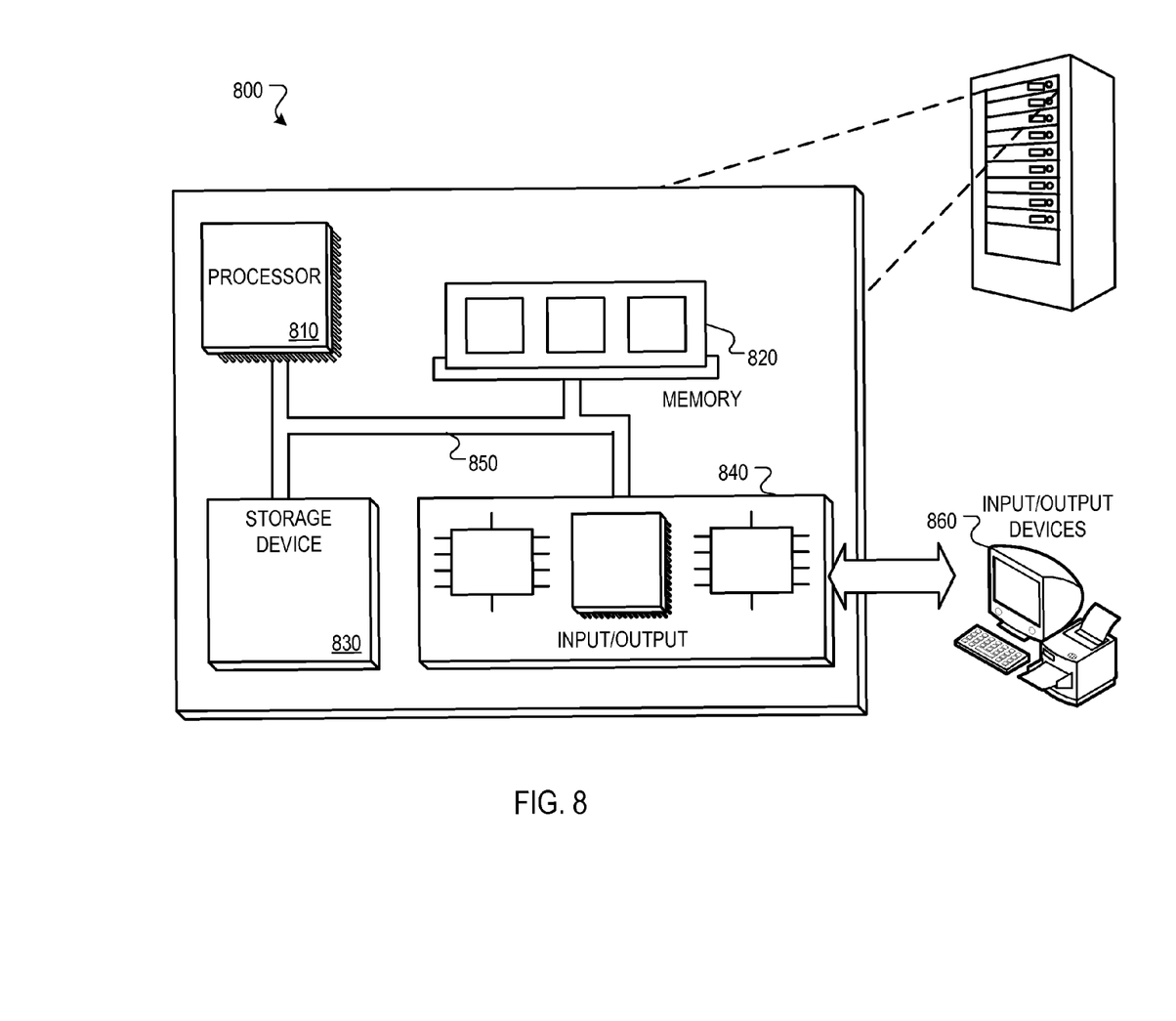
FIG. 8 is a schematic diagram of an example computer system that can be utilized to implement the systems and methods described herein.

FIG. 8 is block diagram of an example computer system 800. The system 800 includes a processor 810, a memory 820, a storage device 830, and an input/output device 840. Each of the components 810, 820, 830, and 840 can, for example, be interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 can, for example, include a hard disk device, an optical disk device, or some other large capacity storage device.

The input/output device 840 provides input/output operations for the system 800. In one implementation, the input/output device 840 can include one or more of a network interface devices, e.g., an Ethernet card, a serial communication device, e.g., RS-232 port, and/or a wireless interface device, e.g., and 802.11 card. In another implementation, the input/output device can include driver devices configured to receive input data and send output data to other input/output devices, e.g., keyboard, printer and display devices 860. Other implementations, however, can also be used, such as mobile computing devices, mobile communication devices, set-top box television client devices, etc.

The apparatus, methods, flow diagrams, and structure block diagrams described in this patent document can be implemented in computer processing systems including program code comprising program instructions that are executable by the computer processing system. Other implementations can also be used. Additionally, the flow diagrams and structure block diagrams described in this patent document, which describe particular methods and/or corresponding acts in support of steps and corresponding functions in support of disclosed structural means, can also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art can effect alterations, modifications and variations to the examples without departing from the scope of the invention.

What is claimed is:

1. A method, comprising:
receiving content items for rendering at respective content item locations in a content page, each of the content items having a rank score indicating a relative likelihood that a user will access the corresponding content item;
determining rendering locations for displaying advertisements in the content page, each of the rendering locations being proximate to a content item location of at least one of the content items in the content page;
ranking the rendering locations based on rank scores of the content items, wherein the rendering locations are assigned a rank based on rank scores of content items proximate to the rendering locations;
receiving multiple advertisements, each of the advertisements being associated with one or more performance measures each indicating an effectiveness of the corresponding advertisement; and
providing the content page for display, the content page comprising the content items and advertisements, the advertisements to be rendered at the rendering locations, wherein an advertisement associated with a higher effectiveness is placed at a higher ranked rendering location, wherein the method is performed by one or more computer devices.

2. The method of claim 1, wherein the one or more performance measures include at least one of a click-through rate or a conversion rate of the corresponding advertisement.

3. The method of claim 1, further comprising:
obtaining a time stamp associated with each of the content items, the time stamp identifying when the corresponding content item was displayed on the content page; and
determining the rank score for each of the content items based on the time stamp associated with each content item.

4. The method of claim 1, wherein the content items include text messages in a message board posted on the content page.

5. The method of claim 4, further comprising:
determining, for each of the text messages, whether the text message has been read by the user; and
determining the rank score for each of the content items based at least in part on whether the text message of the content item has been read by the user.

6. The method of claim 1, further comprising:
obtaining a click-through rate associated with each of the content items; and
determining the rank score for each of the content items based at least in part on the click-through rate associated with the corresponding content item.

7. The method of claim 1, further comprising:
identifying one or more keywords associated with each of the content items;
determining a number of popular keywords among the one or more keywords; and
determining the rank score for each of the content items based at least in part on the number of popular keywords associated with the corresponding content item.

8. A system, comprising:
one or more computer devices programmed to perform operations comprising:
receiving content items for rendering at respective content item locations in a content page, each of the content items having a rank score indicating a relative likelihood that a user will access the corresponding content item;
determining rendering locations for displaying advertisements in the content page, each of the rendering locations being proximate to a content item location of at least one of the content items in the content page;
ranking the rendering locations based on rank scores of the content items, wherein the rendering locations are assigned a rank based on rank scores of content items proximate to the rendering locations;
receiving multiple advertisements, each of the advertisements being associated with one or more performance measures each indicating an effectiveness of the corresponding advertisement; and
providing the content page for display, the content page comprising the content items and advertisements, the advertisements to be rendered at the rendering locations, wherein an advertisement associated with a higher effectiveness is placed at a higher ranked rendering location.

9. The system of claim 8, wherein the one or more performance measures include at least one of a click-through rate or a conversion rate of the corresponding advertisement.

10. The system of claim 8, the operations further comprising:
obtaining a time stamp associated with each of the content items, the time stamp identifying when the corresponding content item was displayed on the content page; and
determining the rank score for each of the content items based on the time stamp associated with each content item.

11. The system of claim 8, wherein the content items include text messages in a message board posted on the content page.

12. The system of claim 11, the operations further comprising:
determining, for each of the text messages, whether the text message has been read by the user; and
determining the rank score for each of the content items based at least in part on whether the text message of the content item has been read by the user.

13. The system of claim 8, the operations further comprising:

obtaining a click-through rate associated with each of the content items; and determining the rank score for each of the content items based at least in part on the click-through rate associated with the corresponding content item.

14. The system of claim 8, the operations further comprising:

identifying one or more keywords associated with each of the content items;

determining a number of popular keywords among the one or more keywords; and determining the rank score for each of the content items based at least in part on the number of popular keywords associated with the corresponding content item.

15. A memory device storing computer program instructions that, when executed, cause a one or more computing devices to perform operations comprising:

receiving content items for rendering at respective content item locations in a content page, each of the content items having a rank score indicating a relative likelihood that a user will access the corresponding content item;

determining rendering locations for displaying advertisements in the content page, each of the rendering locations being proximate to a content item location of at least one of the content items in the content page;

ranking the rendering locations based on rank scores of the content items, wherein the rendering locations are assigned a rank based on rank scores of content items proximate to the rendering locations;

receiving multiple advertisements, each of the advertisements being associated with one or more performance measures each indicating an effectiveness of the corresponding advertisement; and providing the content page for display, the content page comprising the content items and advertisements, the advertisements to be rendered at the rendering locations, wherein an advertisement associated with a higher effectiveness is placed at a higher ranked rendering location.

16. The memory device of claim 15, wherein the one or more performance measures include at least one of a click-through rate or a conversion rate of the corresponding advertisement.

17. The memory device of claim 15, the operations further comprising:

obtaining a time stamp associated with each of the content items, the time stamp identifying when the corresponding content item was displayed on the content page; and determining the rank score for each of the content items based on the time stamp associated with each content item.

18. The memory device of claim 15, wherein the content items include text messages in a message board posted on the content page.

19. The memory device of claim 18, the operations further comprising:

determining, for each of the text messages, whether the text message has been read by the user; and determining the rank score for each of the content items based at least in part on whether the text message of the content item has been read by the user.

20. The memory device of claim 15, the operations further comprising:

obtaining a click-through rate associated with each of the content items; and determining the rank score for each of the content items based at least in part on the click-through rate associated with the corresponding content item.

21. The memory device of claim 15, the operations further comprising:

identifying one or more keywords associated with each of the content items;

determining a number of popular keywords among the one or more keywords; and determining the rank score for each of the content items based at least in part on the number of popular keywords associated with the corresponding content item.

* * * * *

UNITED STATES PATENT AND TRADEMARK OFFICE
CERTIFICATE OF CORRECTION

| | | |
|---|---|---|
| PATENT NO. | : 8,311,875 B1 | Page 1 of 1 |
| APPLICATION NO. | : 11/928840 | |
| DATED | : November 13, 2012 | |
| INVENTOR(S) | : Lloyd | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1189 days.

Signed and Sealed this
Fourteenth Day of October, 2014

Michelle K. Lee
*Deputy Director of the United States Patent and Trademark Office*